(12) United States Patent
Awad et al.

(10) Patent No.: US 12,207,103 B2
(45) Date of Patent: Jan. 21, 2025

(54) COMMUNICATIONS DEVICE FOR DETERMINING BEAM FAILURE DURING INACTIVE STATE AND METHOD

(71) Applicant: Sony Group Corporation, Tokyo (JP)

(72) Inventors: Yassin Aden Awad, Basingstoke (GB); Vivek Sharma, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 280 days.

(21) Appl. No.: 17/789,784

(22) PCT Filed: Dec. 14, 2020

(86) PCT No.: PCT/EP2020/086040
§ 371 (c)(1),
(2) Date: Jun. 29, 2022

(87) PCT Pub. No.: WO2021/144096
PCT Pub. Date: Jul. 22, 2021

(65) Prior Publication Data
US 2023/0037995 A1    Feb. 9, 2023

(30) Foreign Application Priority Data
Jan. 15, 2020    (EP) .................................... 20152038

(51) Int. Cl.
*H04W 16/28*    (2009.01)
*H04B 7/06*    (2006.01)
(Continued)

(52) U.S. Cl.
CPC ....... *H04W 16/28* (2013.01); *H04W 74/0841* (2013.01); *H04W 76/19* (2018.02)

(58) Field of Classification Search
CPC . H04W 16/28; H04W 74/0841; H04W 76/19; H04B 7/0695
See application file for complete search history.

(56) References Cited

U.S. PATENT DOCUMENTS

2019/0166555 A1*   5/2019   Cheng .................... H04W 76/18
2019/0174571 A1*   6/2019   Deenoo ................. H04W 68/02
(Continued)

FOREIGN PATENT DOCUMENTS

EP    3499742 A1    6/2019

OTHER PUBLICATIONS

International Search Report and Written Opinion mailed on Mar. 11, 2021, received for PCT Application PCT/EP2020/086040, filed on Dec. 14, 2020, 13 pages.
(Continued)

*Primary Examiner* — Harry H Kim
(74) *Attorney, Agent, or Firm* — XSENSUS LLP

(57)    ABSTRACT

A communications device is provided. The communications device comprises transceiver circuitry configured to transmit signals and receive signals to and from a wireless communications network, and controller circuitry. The controller circuitry is configured in combination with the transceiver circuitry to transmit to the wireless communications network, whilst operating in an inactive state, one or more signals comprising uplink data using a first of a plurality of beams each for transmission in a different one of a plurality of spatial directions, to detect, whilst operating in the inactive state, that the first beam satisfies a beam failure condition a specified number of consecutive times, and subsequently to determine, whilst operating in the inactive state, that the first beam has failed.

18 Claims, 8 Drawing Sheets

(51) Int. Cl.
*H04W 74/0833* (2024.01)
*H04W 76/19* (2018.01)

(56) References Cited

U.S. PATENT DOCUMENTS

| | | | | |
|---|---|---|---|---|
| 2019/0394082 | A1* | 12/2019 | Cirik | H04W 76/28 |
| 2020/0022011 | A1* | 1/2020 | Lee | H04W 24/10 |
| 2020/0100179 | A1* | 3/2020 | Zhou | H04W 76/20 |
| 2022/0007365 | A1* | 1/2022 | Jung | H04W 24/10 |
| 2022/0210856 | A1* | 6/2022 | Zhang | H04W 76/38 |
| 2022/0338077 | A1* | 10/2022 | Kim | H04W 76/19 |

OTHER PUBLICATIONS

Ericsson, "Fixing UE power efficiency", SA WG2 Meeting #128 BIS, S2-188901, Aug. 20-24, 2018, 9 pages.

3GPP, "LTE; Evolved Universal Terrestrial Radio Access (E-UTRA); Physical layer procedures", ETSI TS 136 213 V13.0.0, May 2016, pp. 1-327.

Holma et al., "LTE for UMTS OFDMA and SC-FDMA Based Radio Access", John Wiley & Sons, 2009, pp. 25-27.

Huawei et al., "UL data transmission in RRC_Inactive,", 3GPP TSG-RAN WG2 #96, R2-168544, Nov. 14-18, 2016, pp. 1-8.

Ericsson, "Baseline solution for small data transmission in RRC_Inactive," 3GPP TSG-RAN WG2 #96, Tdoc R2-168713, Nov. 14-18, 2016, pp. 1-7.

Qualcomm Inc., "Revised WID on NR-based Access to Unlicensed Spectrum", 3GPP TSG RAN Meeting #84, RP-191575, Jun. 3-6, 2019, 8 pages.

Nokia et al., "Revised WID: Support of NR Industrial Internet of Things (IoT)", 3GPP TSG RAN Meeting #85, RP-192324, Sep. 16-20, 2019, 6 pages.

ZTE Corporation, "Revised work item proposal: 2-step RACH for NR", 3GPP TSG RAN Meeting #85, RP-192330, Sep. 16-20, 2019, 4 pages.

ZTE Corporation, "Work Item on NR smalldata transmissions in INACTIVE state", 3GPP TSG RAN Meeting #86, RP-193252, Dec. 9-12, 2019.

3GPP, "Technical Specification Group Radio Access Network; Study on NR-based access to unlicensed spectrum (Release 16)", 3GPP TR 38.889 V16.0.0, Dec. 2018, pp. 1-119.

3GPP, "NR; NR and NG-RAN Overall Description; Stage 2 (Release 15)", 3GPP TS 38.300 V15.0.0, Dec. 2017, pp. 1-68.

3GPP, "Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, pp. 1-365.

3GPP, "NR; NR and NG-RAN Overall Description; Stage 2 (Release 15)", 3GPP TS 38.300 V15.6.0, Jun. 2019, pp. 1-99.

\* cited by examiner

COMMUNICATIONS DEVICE FOR DETERMINING BEAM FAILURE DURING INACTIVE STATE AND METHOD

CROSS-REFERENCE TO RELATED APPLICATIONS

The present application is based on PCT filing PCT/EP2020/086040, filed Dec. 14, 2020, which claims priority to EP 20152038.4, filed Jan. 15, 2020, the entire contents of each are incorporated herein by reference.

BACKGROUND

Field of Disclosure

The present disclosure relates to communications devices which are configured to transmit data to and receive data from a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a communications device. The communications device comprises transceiver circuitry configured to transmit signals and receive signals to and from a wireless communications network, and controller circuitry. The controller circuitry is configured in combination with the transceiver circuitry to transmit to the wireless communications network, whilst operating in an inactive, one or more signals comprising uplink data using a first of a plurality of beams each for transmission in a different one of a plurality of spatial directions, to detect, whilst operating in the inactive state, that the first beam satisfies a beam failure condition a specified number of consecutive times, and subsequently to determine, whilst operating in the inactive state, that the first beam has failed.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
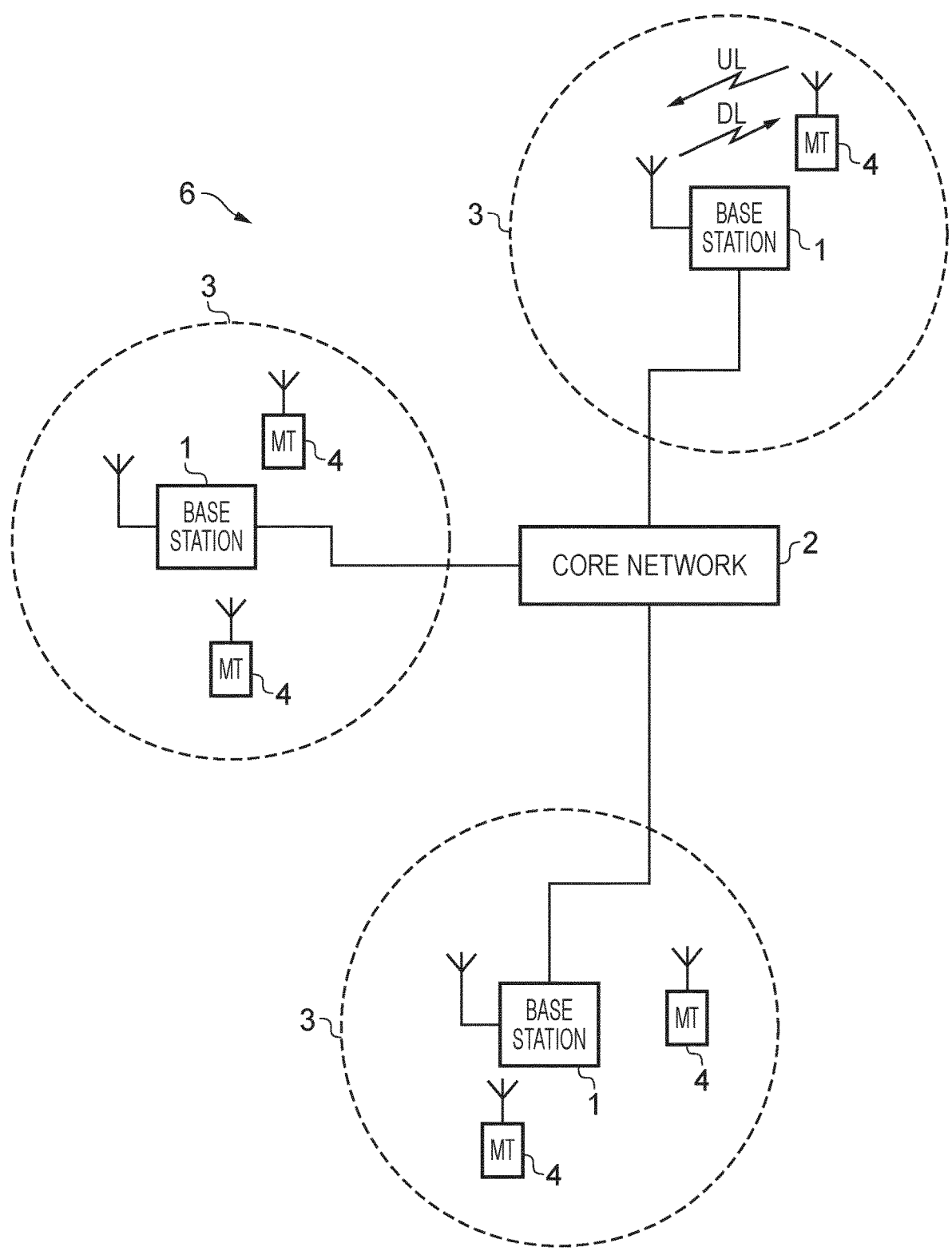
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

3GPP has completed the basic version of 5G in Rel-15, known as the New Radio Access Technology (NR). In addition, enhancements have been made in Rel-16, incorporating new features such as the 2-step RACH procedure [2], Industrial Internet of Things (IIoT) [3] and NR-based Access to Unlicensed Spectrum (NR-U) [4].

Further enhancements have been agreed for Rel-17, such as small data transmissions while the UE is in the RRC_INACTIVE state. With reference to [5], some specific examples of small data transmission and infrequent data traffic may include the following use cases:
Smartphone applications:
   Traffic from Instant Messaging services;
   Heart-beat/keep-alive traffic from IM/email clients and other applications; and
   Push notifications from various applications;
Non-smartphone applications:
   Traffic from wearable devices (e.g. periodic positioning information);
   Sensors (e.g., Industrial Wireless Sensor Networks transmitting temperature or pressure readings, periodically or in an event-triggered manner); and
   Smart meters and smart meter networks sending periodic meter readings.

In addition, based on [5] as mentioned above, uplink small data transmissions have been enabled for UEs in the RRC_INACTIVE state, for RACH based schemes (i.e. 2-step and 4-step RACH, which are discussed in greater detail below). This includes general procedures to enable user plane data transmissions for small data packets in the inactive state (using either MsgA of the 2-step RACH procedure or Msg3 of the 4-step RACH procedure), and enables flexible payload sizes larger than the Rel-16 Common Control Channel (CCCH) message size that is possible currently for a UE in the RRC_INACTIVE state to transmit small data in MsgA or Msg3 to support user plane data transmission in the uplink.

Figure 2:
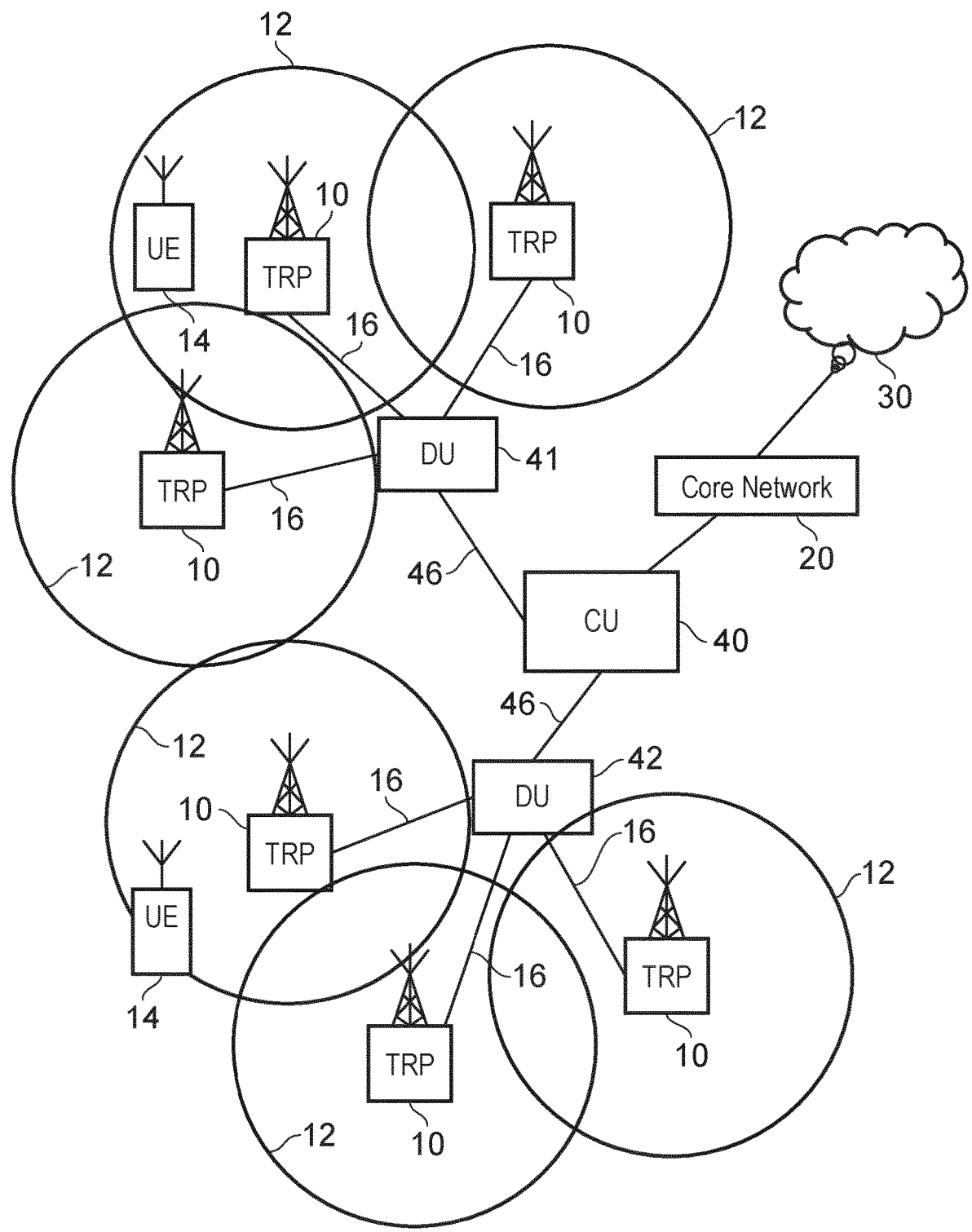
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
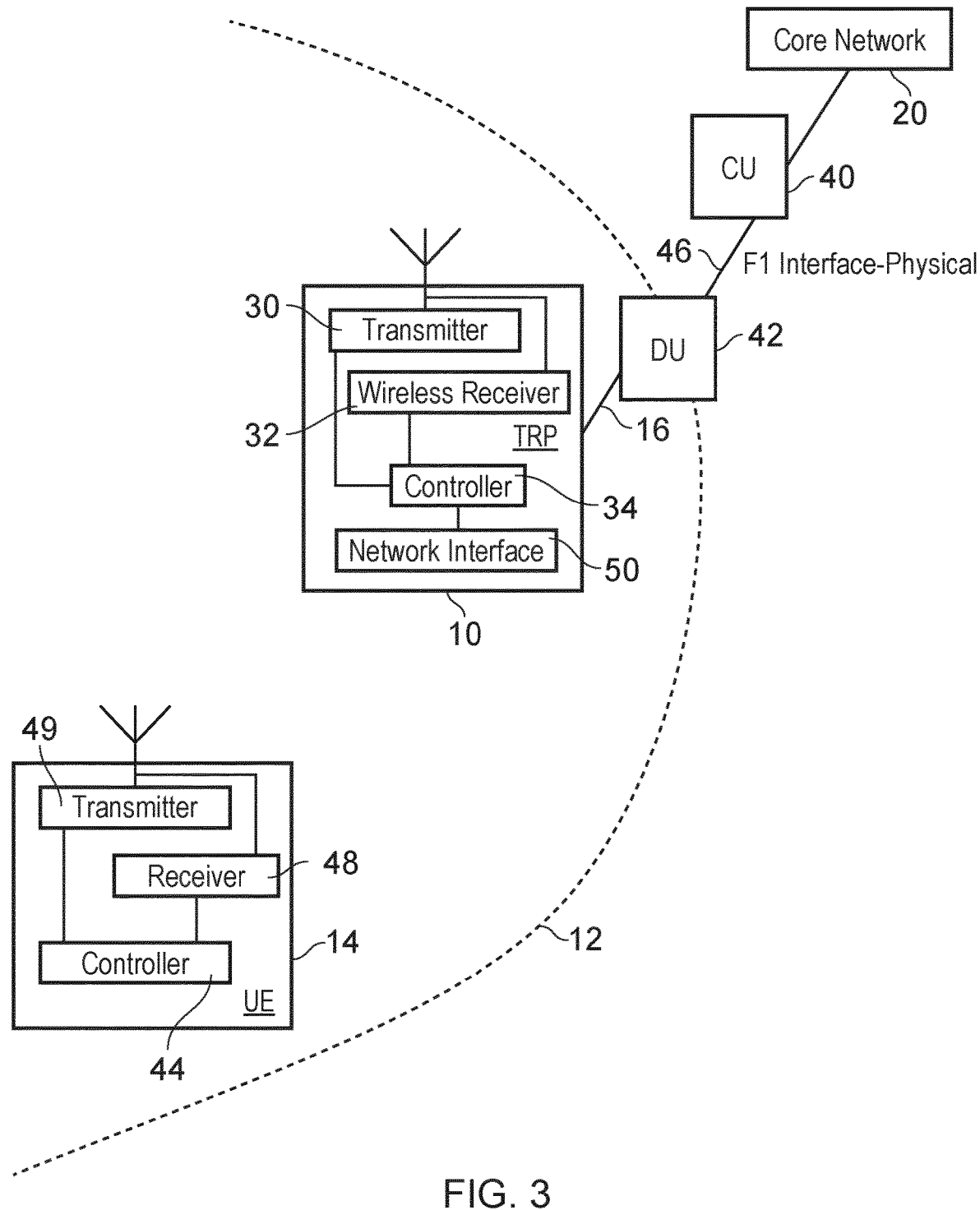
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Bandwidth Parts (BWP)

A communications device and an infrastructure equipment, such as the communications device/mobile terminal 4 and infrastructure equipment/base station 1 of FIG. 1 or the communications device/UE 14 and infrastructure equipment (TRP) 10 of FIG. 2, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 1, 10 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP may be referred to collectively as the numerology of a BWP. Examples of such parameters are sub-carrier spacing, symbol and slot durations and cyclic prefix length.

A BWP may comprise communications resources for uplink or downlink communications. For a communications device, an uplink (UL) BWP and a downlink (DL) BWP may be independently configured, and an association (e.g. pairing) of an UL BWP and a DL BWP may be configured. In some examples, uplink and downlink communications resources are separated in time, in which case time division duplexing (TDD) may be used. In case of TDD, a BWP-pair (UL BWP and DL BWP with the same bwp-id) may have the same centre frequency. In some examples uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications. In the remainder of the present disclosure, the term 'bandwidth part' (BWP) is used to refer to a pair of associated uplink and downlink bandwidth parts and as such, may comprise communications resources for both uplink and downlink transmissions. The terms 'uplink bandwidth part' and 'downlink bandwidth part' will be used where appropriate to refer to a bandwidth part comprising only, respectively, uplink communications resources and downlink communications resources.

An activated BWP refers to a BWP which may be used for the transmission or reception of data to or from the communications device 4, 14. An infrastructure equipment 1, 10 may schedule transmissions to or by the communications device 4, 14 only on a BWP if that BWP is currently activated for the communications device 4, 14. On deactivated BWPs, the communications device 4, 14 may not monitor a PDCCH and may not transmit on PUCCH, PRACH and UL-SCH. Conventionally at most one BWP providing uplink communications resources and at most one BWP providing downlink communications resources may be activated at any given time in respect of a particular communications device.

In light of the differing parameters which may be applicable to BWPs, a single activated BWP may not be suitable for the transmission of data associated with different services, if those different services have different requirements (e.g. latency requirements) or characteristics (e.g. bandwidth/data rate). Prior to being activated, a BWP may be configured for use by the communications device 4, 14. That is, the communications device 4, 14 may determine the characteristics of the BWP, for example, by means of radio resource control (RRC) signalling transmitted by the infrastructure equipment 1.

A BWP may be designated as an initial downlink BWP, which provides the control resource set for downlink information used to schedule downlink transmissions of system information, and a corresponding initial uplink BWP for uplink transmissions for example for initiating PRACH transmission for initial access. A BWP may be designated as a primary BWP which is always activated and which may be used for transmitting control information to or by the communications device 4, 14. Since the primary BWP is always activated and thus may be used for data transmission, it may only be necessary to activate one or more further (secondary) BWPs if the primary BWP is unsuitable for an ongoing or new service or insufficient e.g. due to congestion or lack of bandwidth. Alternatively or additionally, a BWP may be designated as a default BWP. If no BWP is explicitly configured as a default BWP, a BWP which is designated as the initial BWP may be the default BWP.

A default BWP may be defined as a BWP that a UE falls back to after an inactivity timer, associated with a BWP other than the default BWP, expires. For example, where a non-default BWP is deactivated as a result of an associated inactivity timer expiring, and no other non-default BWP is activated, then a default BWP may be activated in response. A default BWP may have an activation or deactivation priority which differs from the activation or deactivation priority of other, non-default, BWPs. A default BWP may be preferentially activated and/or may be deactivated with lowest preference. For example, a default BWP may remain activated unless and until a further BWP is to be activated such that a maximum number of activated BWPs would be exceeded. A default BWP may further be preferentially used for transmitting an indication that a different BWP is to be activated or de-activated.

RACH Procedures in LTE and NR

In wireless telecommunications networks, such as LTE and NR type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order); see, for example, Section 5.3.3.1.3 in ETSI TS 36.213 V13.0.0 (2016-01)/3GPP TS 36.212 version 13.0.0 Release 13 [6].

There are various scenarios in which a network triggered RACH procedure (PDCCH order) may arise. For example:
  a terminal device may receive a PDCCH order to transmit on PRACH as part of a handover procedure;
  a terminal device that is RRC connected to a base station but has not exchanged data with the base station for a relatively long time may receive a PDCCH order to cause the terminal device to transmit a PRACH preamble so that it can be re-synchronised to the network and allow the base station to correct timings for the terminal device;
  a terminal device may receive a PDCCH order so that it can establish a different RRC configuration in the subsequent RACH procedure, this may apply, for example, for a narrowband IoT terminal device which is prevented from RRC reconfiguration in connected mode whereby sending the terminal device to idle mode through a PDCCH order allows the terminal device to be configured in the subsequent PRACH procedure, for example to configure the terminal device for a different coverage enhancement level (e.g. more or fewer repetitions).

For convenience, the term PDCCH order is used herein to refer to signalling transmitted by a base station to instruct a terminal device to initiate a PRACH procedure regardless of the cause. However, it will be appreciated such an instruction may in some cases be transmitted on other channels/in higher layers. For example, in respect of an intra-system handover procedure, what is referred to here as a PDCCH order may be an RRC Connection Reconfiguration instruction transmitted on a downlink shared channel/PDSCH.

When a PDCCH order is transmitted to a terminal device, the terminal device is assigned a PRACH preamble signature sequence to use for the subsequent PRACH procedure. This is different from a terminal device triggered PRACH procedure in which the terminal device selects a preamble from a predefined set and so could by coincidence select the same preamble as another terminal device performing a PRACH procedure at the same time, giving rise to potential contention. Consequently, for PRACH procedures initiated by a PDCCH order there is no contention with other terminal devices undertaking PRACH procedures at the same time because the PRACH preamble for the PDCCH ordered terminal device is scheduled by the network/base station.

Figure 4:
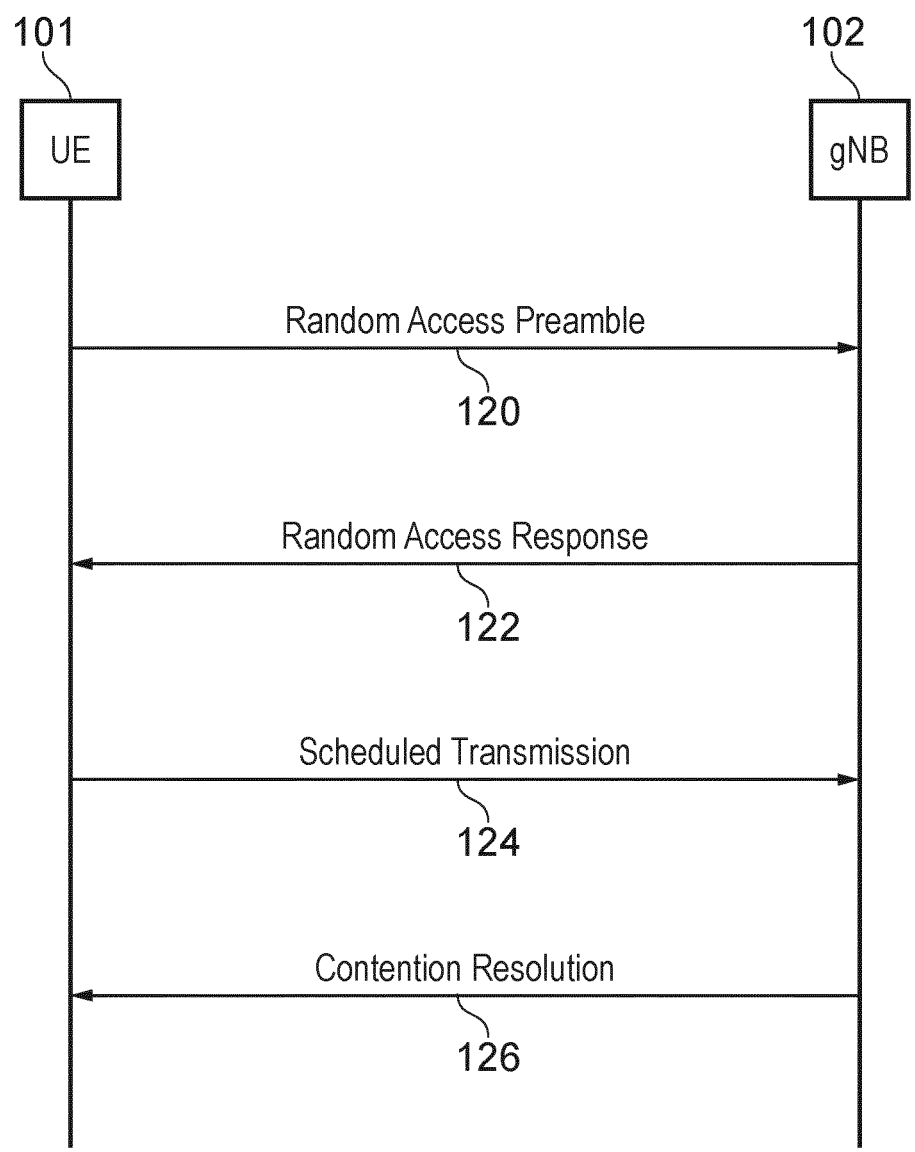
FIG. 4 is a schematic representation illustrating steps in a four-step random access (RACH) procedure in a wireless telecommunications network.

FIG. 4 shows a typical RACH procedure used in LTE systems such as that described by reference to FIG. 1 which could also be applied to an NR wireless communications system such as that described by reference to FIG. 2. A UE 101, which could be in an inactive or idle mode, may have some data which it needs to send to the network. To do so, it sends a random access preamble 120 to a gNodeB 102. This random access preamble 120 indicates the identity of the UE 101 to the gNodeB 102, such that the gNodeB 102 can address the UE 101 during later stages of the RACH procedure. Assuming the random access preamble 120 is successfully received by the gNodeB 102 (and if not, the UE 101 will simply re-transmit it with a higher power), the gNodeB 102 will transmit a random access response 122 message to the UE 101 based on the identity indicated in the received random access preamble 120. The random access response 122 message carries a further identity which is assigned by the gNodeB 102 to identify the UE 101, as well as a timing advance value (such that the UE 101 can change its timing to compensate for the round trip delay caused by its distance from the gNodeB 102) and grant uplink resources for the UE 101 to transmit the data in. Following the reception of the random access response message 122, the UE 101 transmits the scheduled transmission of data 124 to the gNodeB 102, using the identity assigned to it in the random access response message 122. Assuming there are no collisions with other UEs, which may occur if another UE and the UE 101 send the same random access preamble 120 to the gNodeB 102 at the same time and using the same frequency resources, the scheduled transmission of data 124 is successfully received by the gNodeB 102. The gNodeB 102 will respond to the scheduled transmission 124 with a contention resolution message 126.

How UE states (e.g. RRC_IDLE, RRC_CONNECTED etc.) may translate to NR systems has been recently discussed. For example, it has been agreed that a new "inactive" state should be introduced, where the UE should be able to start data transfer with a low delay (as necessitated by RAN requirements). The possibility of the UE being able to transmit data in the inactive state without transition to connected state has also been agreed. Two approaches have been identified as follows, in addition to a baseline move to the connected state before the transmission of data:
  Data could be transmitted together with an initial RRC message requesting a transition to the connected state, or
  Data could be transmitted in a new state.

Figure 5:
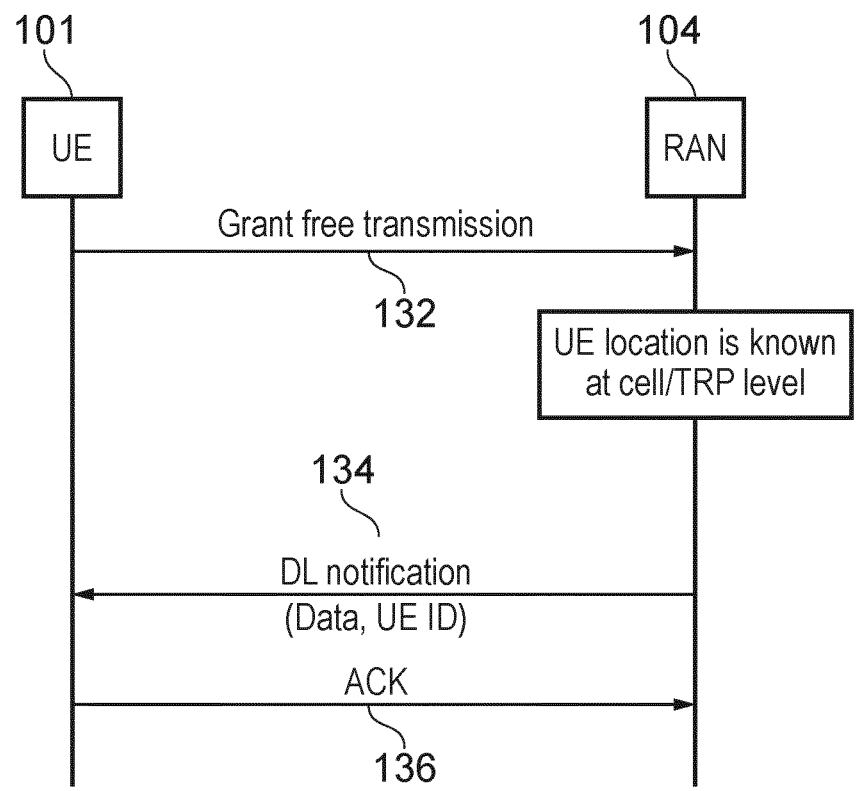
FIG. 5 is a schematic representation illustrating an example of uplink data transmission of a communications device in RRC_INACTIVE mode with a downlink response from the network.

Discussions relating to uplink data transmission in the inactive state have sought solutions for sending uplink data without RRC signalling in the inactive state and without the UE initiating a transition to the connected state. A first potential solution is discussed in [7]. This solution is shown in FIG. 5, which is reproduced along with the accompanying text from [7]. As shown in FIG. 5, an uplink data transmission 132 can be made to a network 104 in the RRC_INACTIVE state by a UE 101. The network 104 here at least knows in which cell the transmission 132 was received, and potentially may even know via which TRP. For a certain amount of time after receiving an uplink data packet, the network 104 could assume that the UE 101 is still in the same location, so that any RLC acknowledgement or application response could be scheduled for transmission to the UE 101 in the same area where the UE 101 is, for example in the next paging response 134. Alternatively, the UE 101 may be paged in a wider area. Following reception of this downlink response 134 the UE 101 may transmit an acknowledgement 136 to the network 104 to indicate that it was successfully received.

Figure 6:
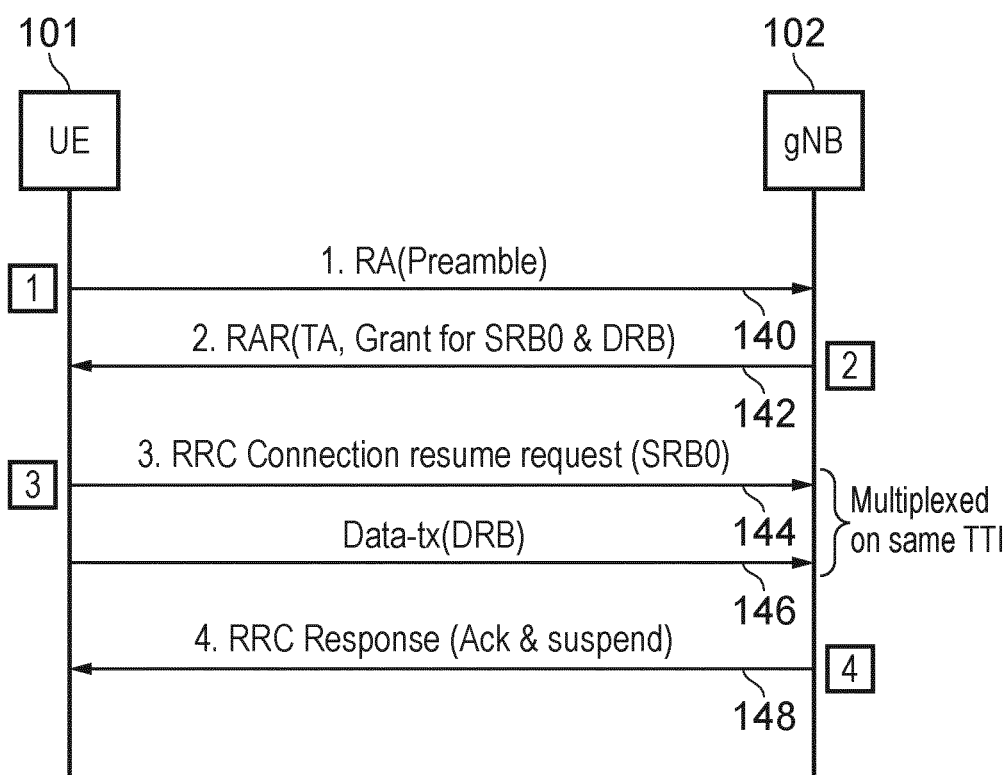
FIG. 6 is a schematic representation illustrating an example four-step RACH procedure which could be applied for transmissions of small amounts of data.

A second potential solution is discussed in [8]. This solution is shown in FIG. 6, which is reproduced along with the accompanying text from [8]. The mechanism described in FIG. 6 is for small data transmissions and is based on the Suspend-Resume mechanism for LTE. The main difference is that User Plane data is transmitted simultaneously with message 3 (the RRC Connection resume request 144 in FIG. 6) and an optional RRC suspend signalled in message 4. As shown in FIG. 6, initially under the assumption of a random access scheme as in LTE, when a UE 101 receives uplink data to transmit to a gNodeB 102 of a mobile communications network, the UE 101 first transmits a random access (RA) preamble 140. Here a special set of preambles (a preamble partition) can be used as in LTE to indicate a small data transmission (meaning that the UE 101 wants a larger grant and possibly that the UE 101 wishes to remain in the inactive state).

The network (via the gNodeB 102) responds with a random access response (RAR) message 142 containing timing advance and a grant. The grant for message 3 should be large enough to fit both the RRC request and a small amount of data. The allowable size of the data could be specified and linked to the preambles, e.g. preamble X asks for a grant to allow Y bytes of data. Depending on available resources, the gNodeB 102 may supply a grant for message 3 accommodating only the resume request, in which case an additional grant could be supplied after reception of message 3.

At this point the UE 101 will prepare the RRC Connection Resume Request 144 and perform the following actions:
  Re-establish Packet Data Convergence Protocol (PDCP) for SRBs and all DRBs that are established;
  Re-establish RLC for signalling radio bearers (SRBs) and all data radio bearers (DRBs) that are established. The PDCP should reset sequence numbers (SN) and hyper frame numbers (HFN) during this step;
  Resume SRBs and all DRBs that are suspended;
  Derive a new security key (e.g. eNB key, or KeNB) possible based on next-hop chaining counters (NCC) provided before the UE 101 was sent to the "inactive" state;
  Generate encryption and integrity protection keys and configure PDCP layers with previously configured security algorithm;
  Generate RRC Connection Resume Request message 144;
  An indication, e.g. a buffer status report (BSR), of potentially remaining data is added;
  An indication that the UE 101 wishes to remain in the inactive state (if this is not indicated by the preamble) is added;
  Apply the default physical channel and media access control (MAC) configuration; and
  Submit RRC Connection Resume Request 144 and data 146 to lower layers for transmission.

After these steps, the lower layers transmit Message 3. This can also contain User Plane data 146 multiplexed by MAC, like existing LTE specifications as security context is already activated to encrypt the User Plane. The signalling (using SRB) and data (using DRB will be multiplexed by MAC layer (meaning the data is not sent on the SRB).

The network (via the gNodeB 102) receives Message 3 and uses the context identifier to retrieve the UE's 101 RRC context and re-establish the PDCP and RLC for the SRBs and DRBs. The RRC context contains the encryption key and the User Plane data is decrypted (will be mapped to the DRB that is re-established or to an always available contention based channel).

Upon successful reception of Message 3 and User Plane data, the network (via the gNodeB 102) responds with a new RRC response message 148 which could either be an "RRC suspend" or an "RRC resume" or an "RRC reject". This transmission resolves contention and acts as an acknowledgement of Message 3. In addition to RRC signalling the network can in the same transmission acknowledge any user data (RLC acknowledgements). Multiplexing of RRC signalling and User Plane acknowledgements will be handled by the MAC layer. If the UE 101 loses the contention then a new attempt is needed.
  In case the network decides to resume the UE 101, the message will be similar to a RRC resume and may include additional RRC parameters.
  In case the network decides to immediately suspend the UE 101, the message will be similar to a RRC suspend. This message can possibly be delayed to allow downlink acknowledgements to be transmitted.
  In case the network sends a resume reject the UE 101 will initiate a new scheduling request (SR) as in LTE, after some potential backoff time.

This procedure will, strictly speaking, transmit the User Plane data without the UE 101 fully entering RRC_CONNECTED, which formerly would happen when the UE 101 receives the RRC Response (Message 4) indicating resume. On the other hand, it uses the RRC context to enable encryption etc. even if the network's decision is to make the UE 101 remain in RRC_INACTIVE by immediately suspending the UE 101 again.

Figure 7:
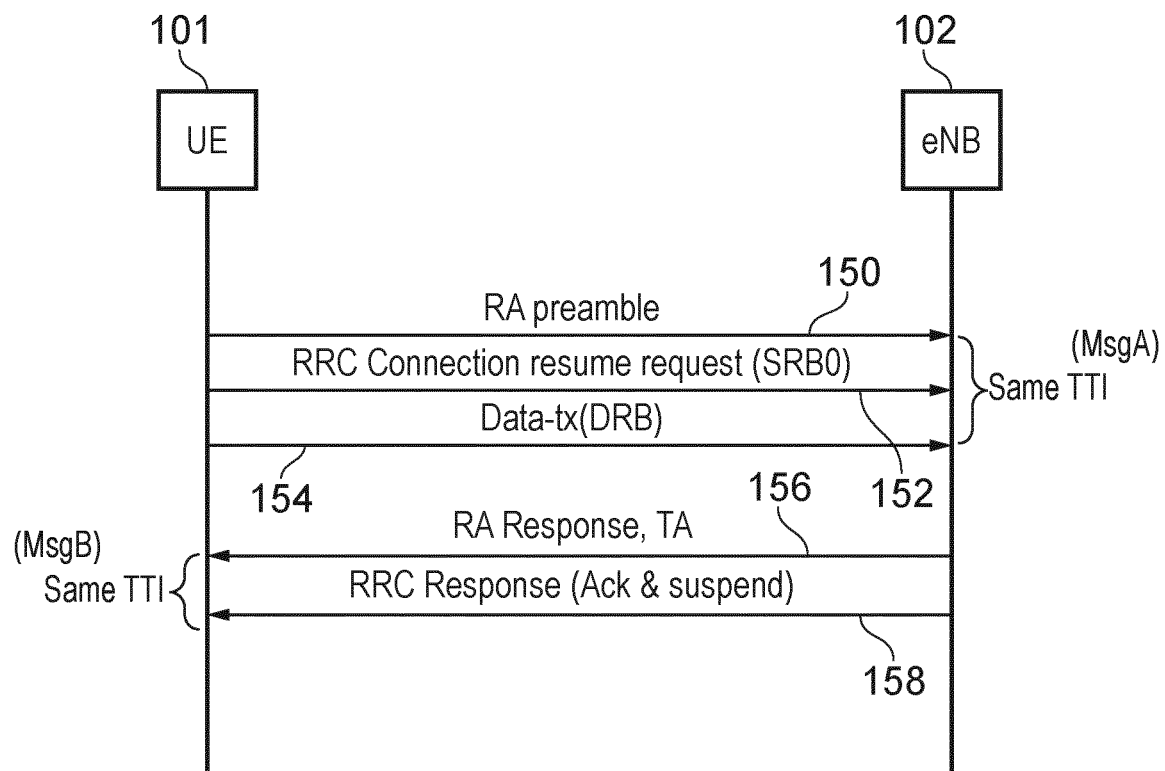
FIG. 7 is a schematic representation illustrating an example two-step RACH procedure which could be applied for transmissions of small amounts of data.
Figure 8:
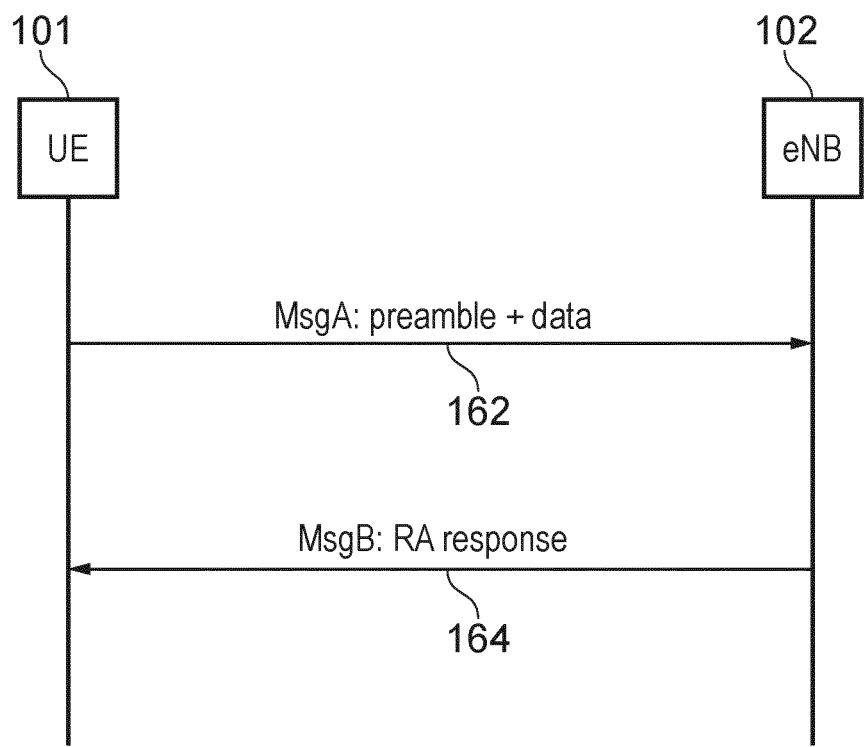
FIG. 8 is a schematic representation illustrating steps in a two-step RACH procedure in a wireless telecommunications network.

FIGS. 7 and 8 each show examples of a simplified two-step RACH procedure, in which small amounts of data can be transmitted by a UE 101 to a gNodeB or eNodeB 102. In the two-step RACH procedure, the data is transmitted at the same time as the RACH preamble (message 162 in FIG. 8), and so there is no need for the UE 101 to wait for a response from the network providing it with an uplink grant to transmit its data. However, the downside is that a limited amount of data can be transmitted in message 1. Following the reception of message 1 at the eNodeB 102, the eNodeB 101 transmits a random access response (message 162 in FIG. 8) to the UE 101, which comprises an acknowledgement of the received data in message 1. FIG. 7 shows the messages in a little more detail, where in message 1 (also termed herein msgA), the random access preamble 150, RRC connection resume request 152 and/or the small amount of data 154 are transmitted during the same transmission time interval (TTI). This message msgA is essentially a combination of Message 1 and Message 3 in the 4-step RACH procedure as shown for example in FIG. 6. Likewise, for message 2 (also termed herein msgB), the random access response with timing advance 156 and the RRC response 158 (comprising an acknowledgement and RRC suspend command) are transmitted by the eNodeB 102 to the UE 101 during the same TTI. This message msgB is essentially a combination of Message 2 and Message 4 in the 4-step RACH procedure as shown for example in FIG. 6. Further details relating to the two-step and four-step RACH procedures can be found in the 3GPP Technical Report 38.889 [9].

RRC Inactive State and RAN Notification Area

The following text and description of RRC_INACTIVE (also termed herein the RRC Inactive state or simply inactive state or inactive mode) and the RAN notification area (RNA) is loosely adapted from [10], and is provided here so as to give a background on RRC_INACTIVE. It should be appreciated that those skilled in the art would have a complete understanding on RRC_INACTIVE, including transition processes between this state and RRC_CONNECTED (also termed herein the RRC Connected state or simply connected state), and the RAN notification area update (RNA), as described in [10], among other documents, and would also have a complete understanding of the RRC_CONNECTED and RRC_IDLE states which have been known in the art for a number of years.

RRC_INACTIVE is a state where a UE remains in the connection management connected (CM-CONNECTED) state and can move within an area configured by the Next-Gen Radio Access Network (NG-RAN)— this area being the RNA— without notifying NG-RAN. In RRC_INACTIVE, the last serving gNodeB node keeps the UE context and the UE-associated NG connection with the serving access and mobility management function (AMF) and user plane function (UPF).

If the last serving gNodeB receives downlink data from the UPF or downlink UE-associated signalling from the AMF (except the UE Context Release Command message) while the UE is in RRC_INACTIVE, it pages in the cells corresponding to the RNA and may send XnAP RAN Paging to neighbour gNodeB(s) if the RNA includes cells of neighbour gNodeB(s).

Upon receiving the UE Context Release Command message while the UE is in RRC_INACTIVE, the last serving gNodeB may page in the cells corresponding to the RNA and may send Xn Application Protocol (XnAP) RAN Paging to neighbour gNodeB(s) if the RNA includes cells of neighbour gNodeB(s), in order to release the UE explicitly.

The AMF provides to the NG-RAN node the RRC Inactive Assistance Information to assist the NG-RAN node's decision as to whether the UE can be controlled to transition to RRC_INACTIVE. The RRC Inactive Assistance Information includes the registration area configured for the UE, the UE specific discontinuous reception (DRX) configuration, Periodic Registration Update timer, an indication if the UE is configured with Mobile Initiated Connection Only (MICO) mode by the AMF, and UE Identity Index value. The UE registration area is taken into account by the NG-RAN node when configuring the RNA. The UE specific DRX configuration and UE Identity Index value are used by the NG-RAN node for RAN paging. The Periodic Registration Update timer is taken into account by the NG-RAN node to configure Periodic RNA Update timer.

At transition to RRC_INACTIVE the NG-RAN node may configure the UE with a periodic RNA Update timer value. If the UE accesses a gNodeB other than the last serving gNodeB, the receiving gNodeB triggers the XnAP Retrieve UE Context procedure to get the UE context from the last serving gNodeB and may also trigger a Data Forwarding procedure including tunnel information for potential recovery of data from the last serving gNodeB. Upon successful UE context retrieval, the receiving gNodeB performs the slice-aware admission control in case of receiving slice information and becomes the serving gNodeB and it further triggers the NG application protocol (NGAP) Path Switch Request and RRC procedures properly. After the path switch procedure, the serving gNodeB triggers release of the UE context at the last serving gNodeB by means of the XnAP UE Context Release procedure.

In case the UE is not reachable at the last serving gNodeB, the gNodeB fails AMF initiated UE-associated class 1 procedures if any, and triggers the NAS Non Delivery Indication procedure to report the non-delivery of any NAS PDU received from the AMF for the UE.

If the UE accesses a gNodeB other than the last serving gNodeB and the receiving gNodeB does not find a valid UE Context, the receiving gNodeB can perform establishment of a new RRC connection instead of resumption of the previous RRC connection.

A UE in the RRC_INACTIVE state is required to initiate RNA update procedure when it moves out of the configured RNA. When receiving RNA update request from the UE, the receiving gNodeB triggers the XnAP Retrieve UE Context procedure to get the UE context from the last serving gNodeB and may decide to send the UE back to RRC_INACTIVE state, move the UE into RRC_CONNECTED state, or send the UE to RRC_IDLE.

A UE in RRC_INACTIVE performs cell reselection. A UE in the RRC_INACTIVE state can be configured by the last serving NG-RAN node with an RNA, where:
the RNA can cover a single or multiple cells, and is contained within the CN registration area; (in [10] it is stated that Xn connectivity should be available within the RNA); and
a RAN-based notification area update (RNAU) is periodically sent by the UE and is also sent when the cell reselection procedure of the UE selects a cell that does not belong to the configured RNA.

There are several different alternatives on how the RNA can be configured:
List of cells:
UE is provided an explicit list of cells (one or more) that constitute the RNA;
List of RAN areas:
A UE is provided (at least one) RAN area ID, where a RAN area is a subset of a CN Tracking Area or equal to a CN Tracking Area. A RAN area is specified by one RAN area ID, which consists of a TAI and optionally a RAN area Code; and
A cell broadcasts one or more RAN area IDs in the system information.

NG-RAN may provide different RNA definitions to different UEs but not mix different definitions to the same UE at the same time. A UE as described in the context of [10] supports all RNA configuration options listed above.

In summary, as described in [10], the RRC_INACTIVE state can be characterised by:
Broadcast of system information;
Cell re-selection mobility;
Paging is initiated by NG-RAN (RAN paging);
RAN-based notification area (RNA) is managed by NG-RAN;
DRX for RAN paging configured by NG-RAN;
5GC—NG-RAN connection (both C/U-planes) is established for UE;
The UE AS context is stored in NG-RAN and the UE; and
NG-RAN knows the RNA which the UE belongs to.

The RNA configured for a UE may cover either a single cell, or multiple cells, and may be smaller than the core network area. An RNA update (RNAU) is transmitted by the UE to the network periodically, and also when the UE's cell reselection procedure selects a cell outside of the configured RNA.

Beam Failure Recovery in NR

Figure 9:
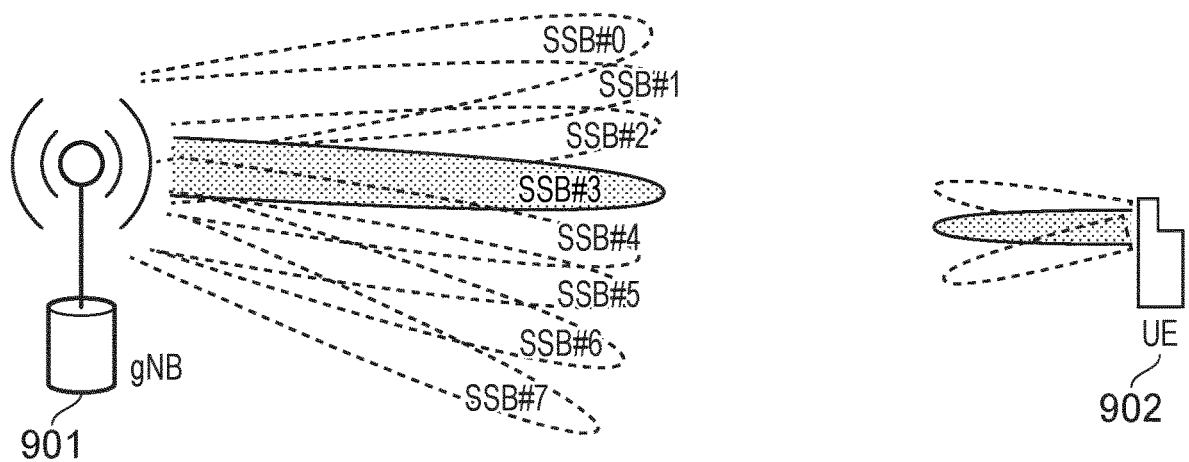
FIG. 9 illustrates an example of beam sweeping performed by a gNodeB.

According to some radio access technologies, including the NR radio access technologies under development by 3GPP, a geographical cell may be formed (or, in other words, 'generated') by a plurality of directional beams Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. A wider beam can be based on synchronisation signal blocks (SSBs) intended for example during initial access (in the RRC_IDLE and RRC_INACTIVE states) while a narrower beam can be formed from channel state information reference signals (CSI-RSs) intended for example for UE-specific beamforming in RRC_CONNECTED state. Depending on the direction of the communications device with respect to the infrastructure equipment, the gain of a particular beam may be sufficiently high (and the resulting coupling loss sufficiently low) to permit communications between the communications device and the infrastructure equipment via the beam. Beams may be formed for transmitting or receiving at the infrastructure equipment using phased antenna arrays, directional antennas, a combination of both, or other known techniques. Typically, a gNodeB will perform beam-sweeping on different directions of a cell, as is shown in FIG. 9. Beam sweeping is where a gNodeB will active one or more of a set of beams at a time (i.e. perform transmission or reception in one or more spatial directions at a time) and change these in turn to cover some or all of the set of beams according to predetermined directions and intervals. As can be seen in FIG. 9, the beam based on SSB #3 is activated by gNodeB 901 for transmitting/receiving signals to/from UE 902; this may have followed SSB #0, SSB #1 and SSB #2 being activated in turn, and may precede each of SSB #4, SSB #5, SSB #6 and SSB #7.

Depending on a UE's location and channel conditions, the UE will identify a number of candidate beams for the reception or transmission of control and data channels. Generally, a beam is referred to as a Transmission Configuration Indication (TCI) state in NR. Provided at least one activated beam (or TCI state) remains available for communication, then beam management systems can update and adapt the set of activated beams in response to one or more beams becoming unsuitable. In NR, beam management systems are employed for controlling beams for use for communications between a UE and a gNodeB while the UE is in the RRC_CONNECTED state. A UE is configured with a number of beams where a subset of the configured beams can be activated, this subset being known as serving beams or activated beams. Such beam management systems as described herein refer collectively to processes and techniques such as the measurement of signals transmitted on one or more beams, an assessment as to whether one or more beams satisfy respective beam failure conditions, indications transmitted by the communications device to the infrastructure equipment to indicate whether or not one or more beams satisfy respective beam failure conditions, a determination that the configuration or activated set of beams are modified, and transmissions indicating control information relating to the beams sent using an activated/serving beam which has not satisfied the beam failure conditions instead of the current one which has failed. Should the current serving beam fail, the beam management system can remove it and replace it with a new beam as long as at least one serving beam is still working and can be used to keep the communications between the gNB and the UE alive. However, should all possible serving beams satisfy the beam failure conditions based on measurements from pre-configured reference signals, it is necessary to initiate a procedure to recover from this situation. This procedure is referred to as beam failure recovery (BFR).

In more detail for NR, the beam failure recovery procedure is introduced in [10]. In the 3GPP specifications, the beam failure recovery mechanism is handled by the lower layers, and comprises a sequence of four actions for a UE in connected state. These four actions are, in order, beam failure detection, new candidate beam identification, beam failure recovery request transmission, and monitoring for a response from the gNodeB to the beam failure recovery request.

As described in [10], for beam failure detection, the gNodeB configures the UE with beam failure detection reference signals and the UE declares beam failure when the number of beam failure instance indications from the physical layer reaches a configured threshold within a configured period. Beam failure detection generally relates to identifying that there is a beam failure due to signal blockage, UE rotation, mobility, etc., where the downlink control channel on a specific beam experiences a very low signal quality. In Rel-15, there can be up to four configured BWPs, in which each configured BWP can have up to two reference signals (RS) used for detecting the beam failure event. However, in Rel-15 there can only be one active BWP at a given time, so the beam failure detection can only take place on the active BWP. In NR, a UE can be configured to monitor up to three control resources (CORESETs) in a slot for a single BWP where each control resource can be residing on a different beam in principle. Hence, it is possible that one serving beam is in good condition while other serving beams have failed. Therefore, it has been agreed by RAN1 that beam failure reporting can only be triggered when all serving beams have failed in a specified period of time, or there has been a number of consecutive beam failures (i.e. a number configured by the network). The main reason for this is that if at least one beam is working, gNodeB and UE can effectively communicate with each other by kicking off an internal beam management system (BMS) where new candidate beams can be added and old weak beams can be removed from the list of serving beams, without ever losing the ability to communicate over at least one good, working beam.

After the UE has recognised that all serving beams have failed it identifies and selects a suitable new beam, by performing SSB-RSRP or CSI-RS-RSRP measurements (i.e. against a predetermined threshold value) and by assessing that a control channel can be received reliably on the new beam, to perform beam failure recovery (if the gNodeB has provided dedicated Random Access resources for certain beams, those will be prioritised by the UE). These measurements and assessment may be performed on SSBs or CSI-RSs associated with one or more candidate beams which are configured but not activated.

If the UE determines that the measurements associated with the one or more candidate beams exceed the predetermined threshold, then the UE is then required to trigger the beam failure recovery by transmitting a request to the gNodeB, which it does by initiating a Random Access (RACH) Procedure, using either contention-free or contention-based RACH resources based on the newly selected good beam in the uplink direction. If contention-free RACH resources are already configured, the UE applies to initiate the RACH procedure on the contention-free resources, and uses contention-based RACH resources otherwise.

Finally, after transmitting the beam failure recovery request message, the UE monitors downlink communications resources associated with the new identified beam. More specifically, the UE may monitor a configured recovery search space, which may be a 'recoverySearchSpace' as described above with relation to [10], having as an identity a 'recoverySearchSpaceId', for downlink control information (DCI). If the UE receives downlink control information in the configured communications resources, which indicates that communications resources on a shared downlink channel (such as the physical downlink shared channel, PDSCH) are scheduled to be used for the transmission by the infrastructure equipment of a response to the beam failure recovery request message, then the UE determines that the beam failure recovery is successful. In response to receiving the downlink control information, the UE sets the new identified beam as an activated beam. The new (activated) beam can be used for subsequent restored communications between the infrastructure equipment and the UE, including the transmission of control information to indication one or more beams which are to be activated for the UE. The UE may decode and process data transmitted using the scheduled communications resources on the shared downlink channel, for example in a conventional manner.

Upon completion of the Random Access procedure, beam failure recovery is considered complete.

As described above, during initial access in NR, a UE determines the best beam and acquires the synchronisation signals, Physical Broadcast Channel (PBCH) and Remaining System Information (RMSI or SIB1) from the best downlink beam. As is described in [5], a UE in RRC_INACTIVE state that intends to transmit small data should use either the 2-Step or 4-step RACH, or should use pre-configured PUSCH resources (PUR) for user plane (UP) data transmission without moving to RRC_CONNECTED state. The UP data is not always a one-shot transmission however, and so depending on the data available at the UE's buffer, subsequent transmissions of small data in UL and DL should be supported which may take several iterations before all data in the UE's buffer is transmitted completely.

As described above, beam failure may happen at any time due to signal blockage, UE rotation and or mobility. Beam failure may also be due to a beam disappearing, in that a UE may detect failure of the beam based on receiving no response from the network after a transmission. In addition, for NR-U, the best serving beam may be blocked by channel access failure (using listen before talk (LBT)). The Rel-15/16 beam management in NR starts when a UE moves into RRC_CONNECTED state, and it is not applicable when the UE is in the RRC_INACTIVE state or during subsequent small data transmissions. Hence, there is a problem in how a beam failure may be detected whilst the UE is in the RRC_INACTIVE, and if one is detected, what actions is the UE required to perform during subsequent transmission of small data in the RRC_INACTIVE state.

Two assumptions may be made here. It can first be assumed that the first data transmission in the uplink follows one of the 2-step/4-step RACH procedures and the corresponding downlink response has been received. In this case, at least the UE's identity is known (e.g. I-RNTI or C-RNTI) at the network, and UE has received a timing advance (TA) command to use for the subsequent small data transmissions. Secondly, in the case that PUR are used for small data transmission in the RRC_INACTIVE state, it can be assumed that the TA is valid at the UE, meaning that the TA is known at the UE, for example because the UE's position/location has not changed since its last connection to this cell, or the TA is not needed due to the cell area being fairly small. Hence, the issue of beam failure would be applicable during subsequent small data transmissions with the assumption that the first uplink data transmission has been received successfully and UE's identity is known at the network. Embodiments of the present technique seek to provide solutions to such a scenario.

Beam Management During Small Data Transmission for RRC_INACTIVE State in Rel-17

Figure 10:
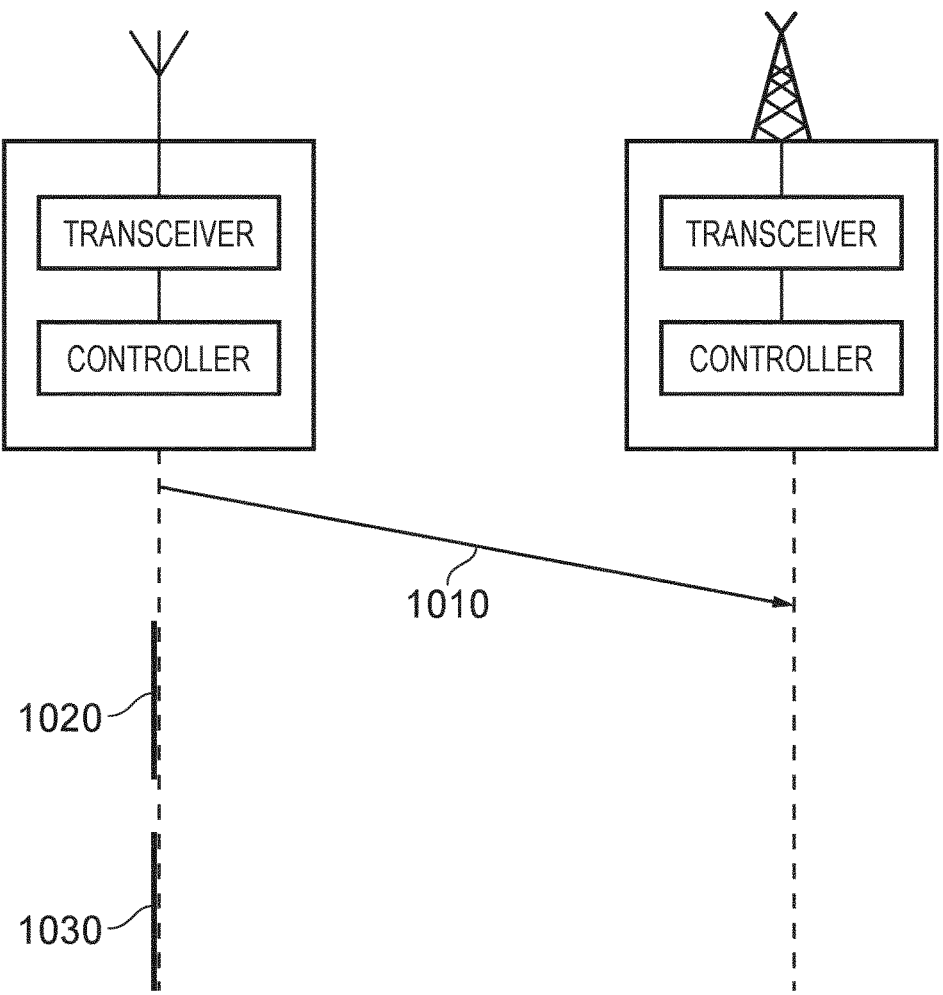
FIG. 10 is a part schematic representation, part message flow diagram of communications between a communications device and a wireless communications network in accordance with embodiments of the present technique.

FIG. 10 provides a part schematic representation, part message flow diagram of communications between a communications device or UE 1001 and a wireless communications network in accordance with embodiments of the present technique. The wireless communications network may include a plurality of infrastructure equipment 1002 which each provide a cell having a coverage area within in one of which the communications device 1001 may be located, and which the communications device 1001 (if mobile) may move between. The communications device 1001 comprises a transceiver (or transceiver circuitry) 1001.t configured to transmit signals to or receive signals from the wireless communications network (for example, to one of the infrastructure equipment 1002 via a wireless access interface provided by the wireless communications network), and a controller (or controller circuitry) 1001.c configured to control the transceiver circuitry 1001.t to transmit or to receive the signals. As can be seen in FIG. 10, an infrastructure equipment 1002 may also comprises a transceiver (or transceiver circuitry) 1002.t configured to transmit signals to or receive signals from the communications device 1001 via the wireless access interface, and a controller (or controller circuitry) 1002.c configured to control the transceiver circuitry 1002.t to transmit or to receive the signals. Each of the controllers 1001.c, 1002.c may be, for example, a microprocessor, a CPU, or a dedicated chipset, etc.

The controller circuitry 1001.c of the communications device 1001 is configured in combination with the transceiver circuitry 1001.t of the communications device 1001 to transmit 1010 to the wireless communications network (for example, to one of the infrastructure equipment 1002), whilst operating in an inactive state (which may be, as those skilled in the art would understand, a state in which the communications device is without an established Radio Resource Control, RRC, connection to the wireless communications network, but does maintain a communications context which it is able to use when transitioning back into a connected state with the network after triggering a resume procedure), one or more signals comprising uplink data using a first of a plurality of beams each for transmission in a different one of a plurality of spatial directions, to detect 1020, whilst operating in the inactive state, that the first beam satisfies a beam failure condition a specified number of consecutive times, and subsequently to determine 1030, whilst operating in the inactive state, that the first beam has failed.

Essentially, embodiments of the present technique provide solutions for how to detect beam failure and define a UE's actions to recover from beam failure due to, for example, signal blockage or mobility in the RRC_INACTIVE state with subsequent small data transmissions. Presently, while beam management has been defined for UEs in the RRC_CONNECTED state as described above, there are no mechanisms known in the art relating to beam management for small data transmission in the RRC_INACTIVE state.

Broadly, embodiments of the present technique can be divided into two implementations. In a first such implementation of embodiments of the present technique, whilst operating in the inactive state and making small data transmissions, a UE measures the serving (i.e. the first) downlink beam, and if the measurement (e.g. of SSB-RSRP) of the serving beam is below a certain threshold, then the UE internally reports a beam failure instance. In other words, the controller circuitry is configured in combination with the transceiver circuitry to perform, whilst operating in the inactive state, (one or more) measurement(s) on the serving beam, and to detect, whilst operating in the inactive state, that the beam failure condition is satisfied when a value of (at least one of) the measurement(s) of the serving beam is below a threshold value. Such measurement(s) may be performed by the communications device periodically, with a set period (e.g. every 5 or 10 or 20 ms). An indication of the threshold value may be received by the communications device as a signal broadcasted by the network (e.g. rsrp-ThresholdSSB: an RSRP threshold used for the selection of an SSB), or the threshold value may be predetermined and known to the communications device. In at least some arrangements, the measurements may comprise one or both of a CSI-RS-RSRP measurement and an SSB-RSRP measurement, or may comprise any other known type of measurement.

Subsequently, if there are a number of consecutive beam failure instances for the serving bean which reach a specified maximum value, then a UE declares a beam failure. For example, the communications device may implement a counter, and if this counter reaches the maximum value, then the UE declares the beam failure. The indication of the specified number of consecutive beam failure instances may be received by the communications device as a signal transmitted by the wireless communications network (either being broadcasted or indicated to the communications device via dedicated signalling), or may be predetermined and known to the communications device.

If beam failure is declared, then a UE may need to select another good beam (i.e. a beam that the communications device has measured and determined for which its SSB-RSRP is above rsrp-ThresholdSSB or a CSI-RS-RSRP threshold) in the same cell and start transmitting a contention-based RACH using either the 4-Step RACH procedure or the 2-Step RACH procedure. In other words, the controller circuitry is configured in combination with the transceiver circuitry to perform, whilst operating in the inactive state, (one or more) measurement(s) on one or more others of the plurality of beams to the first beam, to select, whilst operating in the inactive state, one of the other beams on which the measurement(s) were performed, the selected other beam having been measured by the communications device to have a value of (at least one of the) the measurement(s) above the threshold value, and to initiate, whilst operating in the inactive state, a random access, RACH, procedure with the wireless communications network using the selected other beam, the initiated RACH procedure providing an indication to the wireless communications network that the first beam has failed and an indication that the communications device is performing a beam failure recovery procedure. Here, the first beam and the selected other beam may form part of a same cell of the wireless communications network. As the 2-Step RACH procedure comprises preamble and data, continuing the small data transmission should still be possible with 2-Step RACH procedure. It should be noted by those skilled in the art that a downlink beam always has a corresponding uplink beam during initial access or small data transmission, and this downlink bream and corresponding uplink beam are known as a beam-pair.

If the UE receives a downlink response from the network on the selected beam based on its latest RACH transmission in the uplink, then the UE should assume that the beam failure recovery procedure is successful. In other words, the controller circuitry is configured in combination with the transceiver circuitry to receive, from the wireless communications network whilst operating in the inactive state, a response message to the imitated RACH procedure, and to determine, based on the reception of the response message and whilst operating in the inactive state, that the beam failure recovery procedure is successful.

In a second implementation of embodiments of the present technique, where the UE transmits uplink small data a consecutive number of times (including retransmissions) on the same beam-pair and does not receive a response in the downlink for any of those consecutive number of times, then the UE declares a beam failure. In other words, the controller circuitry is configured in combination with the transceiver circuitry to detect, whilst operating in the inactive state, that the beam failure condition is satisfied when the communications device determines that a response has not been received from the wireless communications network for a transmitted signal comprising uplink data. As with the first implementation, the communications device may implement a counter, and if this counter reaches a specified maximum value (i.e. no response is received for the consecutive number of times), then the UE declares the beam failure. Again, the indication of the specified number of consecutive beam failure instances may be received by the communications device as a signal broadcasted by the wireless communications network, or may be predetermined and known to the communications device. In some arrangements of embodiments of the present technique, a variable defining the specified consecutive number of times could take a value "0" and may be configured by the network. Here, the UE will simply declare a beam failure after a single beam failure instance, rather than after consecutive beam failure instances.

The communications device may implement a timer, where the timer is re-started every time that UE transmits small data in the uplink and if the timer expires before receiving a downlink response the counter is increased. As above, if this counter reaches a maximum value defined by the network (or by the UE implementation), then the UE declares the beam failure. In other words, the controller circuitry is configured in combination with the transceiver circuitry to reset, whilst operating in the inactive state, a timer each time a signal comprising uplink data is transmitted, the timer being configured to expire after a specified period of time, and to detect, whilst operating in the inactive state, that the beam failure condition is satisfied when the communications device determines that response has not been received from the wireless communications network for the transmitted signal comprising uplink data before the timer has expired. Here, the specified period of time may be predetermined and known to the communications device, or an indication of the specified period of time may be received by the communications device as a signal transmitted (either being broadcasted or indicated to the communications device via dedicated signalling) by the wireless communications network.

If beam failure is declared, then the UE may in some arrangements initiate a random access (RACH) procedure in the same cell with the intention to move into a connected mode. After the UE is in connected mode, then the UE can transmit as much data as it wants, and then may go again to RRC_INACTIVE state. In other words, the controller circuitry is configured in combination with the transceiver circuitry to initiate, whilst operating in the inactive state, RACH procedure with the wireless communications network, and to express its intention (for example by providing transmitting an indication of such to the wireless communications network) for transition from the inactive state into a connected state with the wireless communications network. Here, the controller circuitry may further be configured in combination with the transceiver circuitry to transmit, whilst operating in the connected state, the signals comprising uplink data to the wireless communications network.

As described above, the value of the counter and of the timer may be configured by the gNodeB and indicated to the communications device in a broadcasted message or otherwise by direct signalling. However, as also described above, in at least some arrangements, the values of the counter and of the timer may be left to UE implementation. The rationale for this approach is that either the current conditions of radio channel are bad or the UE is moving fast, and thus it may be difficult to implement the full BFR procedure for a small data transmission as BFR may take too long a time to trigger compared to the duration of small data transmission. Therefore, it may be better that UE takes autonomous action and so the gNodeB will simply assume that the link is lost and that the UE will itself recover the communications link by initiating a RACH procedure. In such a procedure, the communications device may also provide its intention to change its RRC state.

For changing its RRC state (due to beam failure or high mobility), after a number of attempts based on UE implementation, the UE enters another RRC state; i.e. RRC_CONNECTED or RRC_IDLE or RRC_CONNECTED via the RRC_IDLE state or stays in the RRC_INACTIVE state but performs a RACH procedure. The UE may initiate a Resume procedure for RRC_INACTIVE to RRC_CONNECTED transition and uses a new resume Cause indicating its intention to move to RRC_CONNECTED state. Alternatively, the UE may move to the RRC_IDLE state and start with the initial access, and then transition to the RRC_CONNECTED mode. The gNodeB may reconcile the UE context in the RRC_INACTIVE state and the new attempt to RRC_CONNECTED state via the RRC_IDLE state may then be based on the UE ID (e.g. C-RNTI). In other words, the controller circuitry is configured in combination with the transceiver circuitry to perform one of an initial access procedure and a resume procedure with the wireless communications network in order to indicate an intention to enter a connected state with the wireless communications network. The communications device may then be configured to transition from the idle state into the connected state with the wireless communications network.

In another arrangement of embodiments of the present technique, the UE enters the RRC_IDLE state and relies on core network (CN) paging to enter the RRC_CONNECTED mode. The gNodeB will have a fair idea by this time about the amount of data in the UE's buffer, and must inform CN to initiate CN paging. In other words, the controller circuitry is configured in combination with the transceiver circuitry to transition from the inactive state into an idle state—this may be an autonomous UE action. Then, the controller circuitry is configured in combination with the transceiver circuitry to receive, whilst operating in the idle state, a paging message from a core network, CN, part of the wireless communications network, the paging message indicating that the communications device should transition from the idle state into a connected state with the wireless communications network, and to transition from the idle state into the connected state with the wireless communications network. Here, the controller circuitry may be configured in combination with the transceiver circuitry to transmit, whilst operating in the connected state, the signals comprising uplink data to the wireless communications network.

In another arrangement of embodiments of the present technique, the UE simply stays in the RRC_INACTIVE state after failed attempts and the gNodeB uses a RAN-based paging procedure, i.e. UE does not initiate a RACH procedure but simply waits. In other words, the controller circuitry is configured in combination with the transceiver circuitry to receive, whilst operating in the inactive state, a paging message from a radio access network, RAN, part of the wireless communications network, the paging message indicating that the communications device should initiate a resume procedure in order to indicate an intention to enter a connected state with the wireless communications network. Again here, the controller circuitry may be configured in combination with the transceiver circuitry to transmit, whilst operating in the connected state, the signals comprising uplink data to the wireless communications network.

It would also be clear to those skilled in the art that beam failure detection could be detected and acted upon by the network rather than the UE, and thus this is within the scope of embodiments of the present technique. For example, here the network (for example a network infrastructure equipment) may be configured to transmit, to the communications device whilst the communications device is operating in an inactive state, one or more downlink signals using a first of a plurality of beams each for transmission in a different one of a plurality of spatial directions, to detect that, for a specified number of consecutive times, a response to one or more of the downlink signals has not been received from the communications device, and subsequently to determine that the first beam has failed. As with the UE's detection of the beam failure condition, the gNB may in some arrangements implement a timer in order to determine whether or not a response has been received from the UE, and as described above, may either transmit a paging message or inform the core network to initiate core network paging in order to instruct the UE to initiate a RACH, a resume or an initial access procedure.

Flow Diagram Representation

Figure 11:
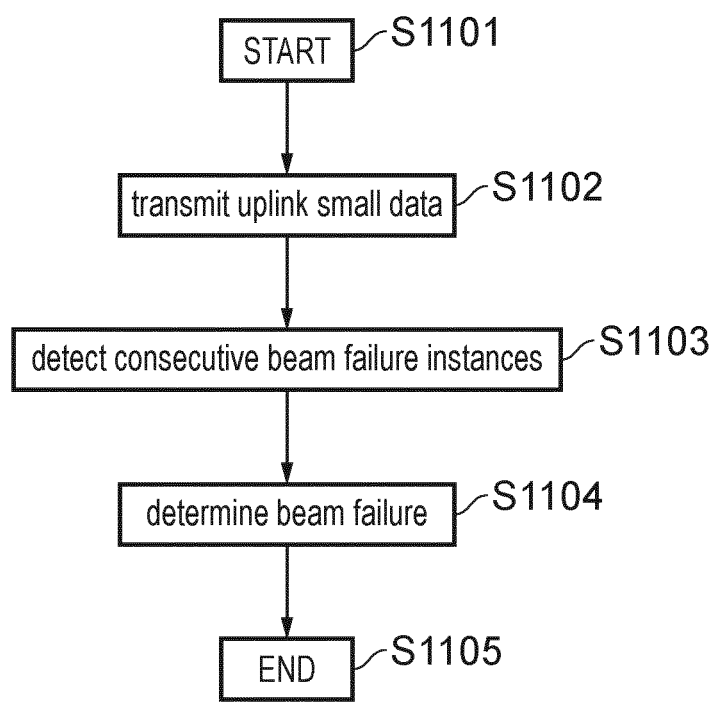
FIG. 11 shows a flow diagram illustrating a method of operating a communications device in accordance with embodiments of the present technique.

FIG. 11 shows a flow diagram illustrating a method of operating a communications device in a wireless communications network. The method begins in step S1101. The method comprises, in step S1102, transmitting to the wireless communications network (e.g. to an infrastructure equipment of the wireless communications network), whilst operating in an inactive state, one or more signals comprising uplink data using a first of a plurality of beams each for transmission in a different one of a plurality of spatial directions. In step S1103, the process comprises detecting, whilst operating in the inactive state, that the first beam satisfies a beam failure condition a specified number of consecutive times, and subsequently in step S1104, comprises determining, whilst operating in the inactive state, that the first beam has failed. The process ends in step S1105.

Those skilled in the art would appreciate that the methods shown by FIG. 11 may be adapted in accordance with embodiments of the present technique. For example, other intermediate steps may be included in the methods, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device comprising
- transceiver circuitry configured to transmit signals and receive signals to and from a wireless communications network, and
- controller circuitry configured in combination with the transceiver circuitry
  - to transmit to the wireless communications network, whilst operating in an inactive state, one or more signals comprising uplink data using a first of a plurality of beams each for transmission in a different one of a plurality of spatial directions,
  - to detect, whilst operating in the inactive state, that the first beam satisfies a beam failure condition a specified number of consecutive times, and subsequently
  - to determine, whilst operating in the inactive state, that the first beam has failed.

Paragraph 2. A communications device according to Paragraph 1, wherein the controller circuitry is configured in combination with the transceiver circuitry
- to perform, whilst operating in the inactive state, measurements on the first beam, and
- to detect, whilst operating in the inactive state, that the beam failure condition is satisfied when a value of the measurement of the first beam is below a threshold value.

Paragraph 3. A communications device according to Paragraph 2, wherein the controller circuitry is configured in combination with the transceiver circuitry
- to perform, whilst operating in the inactive state, measurements on one or more others of the plurality of beams to the first beam,
- to select, whilst operating in the inactive state, one of the other beams on which the measurements were performed, the selected other beam having been measured by the communications device to have a value of the measurement above the threshold value, and
- to initiate, whilst operating in the inactive state, a random access, RACH, procedure with the wireless communications network using the selected other beam, the initiated RACH procedure providing an indication to the wireless communications network that the first beam has failed and an indication that the communications device is performing a beam failure recovery procedure.

Paragraph 4. A communications device according to Paragraph 3, wherein the controller circuitry is configured in combination with the transceiver circuitry
- to receive, from the wireless communications network whilst operating in the inactive state, a response message to the imitated RACH procedure, and
- to determine, based on the reception of the response message and whilst operating in the inactive state, that the beam failure recovery procedure is successful.

Paragraph 5. A communications device according to Paragraph 3 or Paragraph 4, wherein the first beam and the selected other beam form part of a same cell of the wireless communications network.

Paragraph 6. A communications device according to any of Paragraphs 2 to 5, where the measurements are performed with a set period.

Paragraph 7. A communications device according to any of Paragraphs 2 to 6, where the measurements comprise one or both of a Channel State Information-Reference Signal-Reference Signal Received Power, CSI-RS-RSRP, measurement and a Synchronisation Signal Block-Reference Signal Received Power, SSB-RSRP, measurement.

Paragraph 8. A communications device according to any of Paragraphs 2 to 7, where the threshold value is predetermined and known to the communications device.

Paragraph 9. A communications device according to any of Paragraphs 2 to 8, where an indication the threshold value is received by the communications device as a signal from the wireless communications network.

Paragraph 10. A communications device according to any of Paragraphs 1 to 9, wherein the controller circuitry is configured in combination with the transceiver circuitry
- to detect, whilst operating in the inactive state, that the beam failure condition is satisfied when the communications device determines that a response has not been received from the wireless communications network for a transmitted signal comprising uplink data.

Paragraph 11. A communications device according to Paragraph 10, wherein the controller circuitry is configured in combination with the transceiver circuitry
- to reset, whilst operating in the inactive state, a timer each time a signal comprising uplink data is transmitted, the timer being configured to expire after a specified period of time, and
- to detect, whilst operating in the inactive state, that the beam failure condition is satisfied when the communications device determines that response has not been received from the wireless communications network for the transmitted signal comprising uplink data before the timer has expired.

Paragraph 12. A communications device according to Paragraph 11, where the specified period of time is predetermined and known to the communications device.

Paragraph 13. A communications device according to Paragraph 11 or Paragraph 12, where an indication of the specified period of time is received by the communications device as a signal from the wireless communications network.

Paragraph 14. A communications device according to any of Paragraphs 10 to 13, wherein the controller circuitry is configured in combination with the transceiver circuitry
- to initiate, whilst operating in the inactive state, RACH procedure with the wireless communications network, and
- to express an intention for transition from the inactive state into a connected state with the wireless communications network.

Paragraph 15. A communications device according to Paragraph 14, wherein the controller circuitry is configured in combination with the transceiver circuitry
- to transmit, whilst operating in the connected state, the signals comprising uplink data to the wireless communications network.

Paragraph 16. A communications device according to any of Paragraphs 10 to 15, wherein the controller circuitry is configured in combination with the transceiver circuitry
- to transition from the inactive state into an idle state.

Paragraph 17. A communications device according to Paragraph 16, wherein the controller circuitry is configured in combination with the transceiver circuitry
- to receive, whilst operating in the idle state, a paging message from a core network, CN, part of the wireless communications network, the paging message indicating that the communications device should transition from the idle state into a connected state with the wireless communications network, and to transition from the idle state into the connected state with the wireless communications network.

Paragraph 18. A communications device according to Paragraph 17, wherein the controller circuitry is configured in combination with the transceiver circuitry
to transmit, whilst operating in the connected state, the signals comprising uplink data to the wireless communications network.

Paragraph 19. A communications device according to any of Paragraphs 16 to 18, wherein the controller circuitry is configured in combination with the transceiver circuitry
to perform one of an initial access procedure and a resume procedure with the wireless communications network in order to indicate an intention to enter a connected state with the wireless communications network.

Paragraph 20. A communications device according to any of Paragraphs 10 to 19, wherein the controller circuitry is configured in combination with the transceiver circuitry
to receive, whilst operating in the inactive state, a paging message from a radio access network, RAN, part of the wireless communications network, the paging message indicating that the communications device should initiate a resume procedure in order to indicate an intention to enter a connected state with the wireless communications network.

Paragraph 21. A communications device according to Paragraph 20, wherein the controller circuitry is configured in combination with the transceiver circuitry
to transmit, whilst operating in the connected state, the signals comprising uplink data to the wireless communications network.

Paragraph 22. A communications device according to any of Paragraphs 1 to 21, wherein an indication of the specified number of consecutive times is received by the communications device as a signal broadcasted by the wireless communications network.

Paragraph 23. A communications device according to any of Paragraphs 1 to 22, wherein an indication of the specified number of consecutive times is predetermined and known to the communications device.

Paragraph 24. A method of operating a communications device, the method comprising
transmitting to the wireless communications network, whilst operating in an inactive state, one or more signals comprising uplink data using a first of a plurality of beams each for transmission in a different one of a plurality of spatial directions,
detecting, whilst operating in the inactive state, that the first beam satisfies a beam failure condition a specified number of consecutive times, and subsequently
determining, whilst operating in the inactive state, that the first beam has failed.

Paragraph 25. Circuitry for a communications device comprising
transceiver circuitry configured to transmit signals and receive signals to and from a wireless communications network, and
controller circuitry configured in combination with the transceiver circuitry
to transmit to the wireless communications network, whilst operating in an inactive state, one or more signals comprising uplink data using a first of a plurality of beams each for transmission in a different one of a plurality of spatial directions,
to detect, whilst operating in the inactive state, that the first beam satisfies a beam failure condition a specified number of consecutive times, and subsequently
to determine, whilst operating in the inactive state, that the first beam has failed.

Paragraph 26. An infrastructure equipment forming part of a wireless communications network, the infrastructure equipment comprising
transceiver circuitry configured to transmit signals and receive signals to and from a communications device, and
controller circuitry configured in combination with the transceiver circuitry
to transmit, to the communications device whilst the communications device is operating in an inactive state, one or more downlink signals using a first of a plurality of beams each for transmission in a different one of a plurality of spatial directions,
to detect that, for a specified number of consecutive times, a response to one or more of the downlink signals has not been received from the communications device, and subsequently
to determine that the first beam has failed.

Paragraph 27. An infrastructure equipment according to Paragraph 26, wherein the controller circuitry is configured in combination with the transceiver circuitry
to reset a timer each time a downlink signal is transmitted, the timer being configured to expire after a specified period of time, and
to detect that a response has not been received from the communications device for the transmitted downlink signal before the timer has expired.

Paragraph 28. An infrastructure equipment according to Paragraph 26 or Paragraph 27, wherein the controller circuitry is configured in combination with the transceiver circuitry
to transmit, to a core network, CN, part of the wireless communications network, an indication that the communications device should be sent a paging message by the CN part in order for the communications device to transmit uplink signals to the wireless communications network.

Paragraph 29. An infrastructure equipment according to Paragraph 28, wherein the paging message indicates that the communications device should enter a connected state with the wireless communications network.

Paragraph 30. An infrastructure equipment according to any of Paragraphs 26 to 29, wherein the controller circuitry is configured in combination with the transceiver circuitry
to transmit, to the communications device, a paging message indicating that the communications device should initiate a resume procedure in order to indicate an intention to enter a connected state with the wireless communications network.

Paragraph 31. A method of operating an infrastructure equipment forming part of a wireless communications network, the method comprising
transmitting, to a communications device whilst the communications device is operating in an inactive state, one or more downlink signals using a first of a plurality of beams each for transmission in a different one of a plurality of spatial directions,
detecting that, for a specified number of consecutive times, a response to one or more of the downlink signals has not been received from the communications device, and subsequently
determining that the first beam has failed.

Paragraph 32. Circuitry for an infrastructure equipment forming part of a wireless communications network, the infrastructure equipment comprising transceiver circuitry configured to transmit signals and
receive signals to and from a communications device,
and
controller circuitry configured in combination with the
transceiver circuitry
to transmit, to the communications device whilst the
communications device is operating in an inactive
state, one or more downlink signals using a first of a
plurality of beams each for transmission in a different
one of a plurality of spatial directions,
to detect that, for a specified number of consecutive times,
a response to one or more of the downlink signals has
not been received from the communications device,
and subsequently
to determine that the first beam has failed.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-192330, "New work item: 2-step RACH for NR," ZTE Corporation, 3GPP TSG RAN Meeting #85.
[3] RP-192324, "Revised WID: Support of NR Industrial Internet of Things (IoT)," Nokia, Nokia Shanghai Bell, 3GPP TSG RAN Meeting #85.
[4] RP-191575, "NR-based Access to Unlicensed Spectrum," Qualcomm, Inc., 3GPP TSG RAN Meeting #84.
[5] RP-193252, "New Work Item on NR small data transmission in INACTIVE state," ZTE Corporation, 3GPP TSG RAN Meeting #86.
[6] ETSI TS 136 213 V13.0.0 (2016-01)/3GPP TS 36.212 version 13.0.0 Release 13.
[7] R2-168544, "UL data transmission in RRC_INACTIVE," Huawei, HiSilicon, RAN #96.
[8] R2-168713, "Baseline solution for small data transmission in RRC_INACTIVE," Ericsson, Ran #96.
[9] TR 38.889, V16.0.0, "$3^{rd}$ Generation Partnership Project; Technical Specification Group Radio Access Network; Study on NR-based Access to Unlicensed Spectrum; (Release 16)," 3GPP, December 2018.
[10] TS 38.300, "NR and NG-RAN Overall Description; Stage 2 (Release 15)", $3^{rd}$ Generation Partnership Project.

What is claimed is:

1. A communications device comprising
transceiver circuitry configured to transmit signals and receive signals to and from a wireless communications network, and
controller circuitry configured in combination with the transceiver circuitry
to transmit to the wireless communications network, whilst operating in an inactive state, one or more signals comprising uplink data using a first of a plurality of beams each for transmission in a different one of a plurality of spatial directions,
to detect, whilst operating in the inactive state, that the first beam satisfies a beam failure condition a specified number of consecutive times, subsequently
to determine, whilst operating in the inactive state, that the first beam has failed,
to reset, whilst operating in the inactive state, a timer each time a signal comprising uplink data is transmitted, the timer being configured to expire after a specified period of time, and
to detect, whilst operating in the inactive state, that the beam failure condition is satisfied when the communications device determines that a response has not been received from the wireless communications network for a transmitted signal comprising uplink data before the timer has expired.

2. The communications device according to claim 1, wherein the controller circuitry is configured in combination with the transceiver circuitry
to perform, whilst operating in the inactive state, measurements on the first beam, and
to detect, whilst operating in the inactive state, that the beam failure condition is satisfied when a value of the measurement of the first beam is below a threshold value.

3. The communications device according to claim 2, wherein the controller circuitry is configured in combination with the transceiver circuitry
to perform, whilst operating in the inactive state, measurements on one or more others of the plurality of beams to the first beam,
to select, whilst operating in the inactive state, one of the other beams on which the measurements were performed, the selected other beam having been measured by the communications device to have a value of the measurement above the threshold value, and
to initiate, whilst operating in the inactive state, a random access, RACH, procedure with the wireless communications network using the selected other beam, the initiated RACH procedure providing an indication to the wireless communications network that the first beam has failed and an indication that the communications device is performing a beam failure recovery procedure.

4. The communications device according to claim 3, wherein the controller circuitry is configured in combination with the transceiver circuitry
- to receive, from the wireless communications network whilst operating in the inactive state, a response message to the imitated RACH procedure, and
- to determine, based on the reception of the response message and whilst operating in the inactive state, that the beam failure recovery procedure is successful.

5. The communications device according to claim 3, wherein the first beam and the selected other beam form part of a same cell of the wireless communications network.

6. The communications device according to claim 2, where the measurements are performed with a set period.

7. The communications device according to claim 2, where the measurements comprise one or both of a Channel State Information-Reference Signal-Reference Signal Received Power, CSI-RS-RSRP, measurement and a Synchronisation Signal Block-Reference Signal Received Power, SSB-RSRP, measurement.

8. The communications device according to claim 2, where the threshold value is predetermined and known to the communications device.

9. The communications device according to claim 2, where an indication the threshold value is received by the communications device as a signal from the wireless communications network.

10. The communications device according to claim 1, where the specified period of time is predetermined and known to the communications device.

11. The communications device according to claim 1, where an indication of the specified period of time is received by the communications device as a signal from the wireless communications network.

12. The communications device according to claim 1, wherein the controller circuitry is configured in combination with the transceiver circuitry
- to initiate, whilst operating in the inactive state, RACH procedure with the wireless communications network, and
- to express an intention for transition from the inactive state into a connected state with the wireless communications network.

13. The communications device according to claim 12, wherein the controller circuitry is configured in combination with the transceiver circuitry
- to transmit, whilst operating in the connected state, the signals comprising uplink data to the wireless communications network.

14. The communications device according to claim 1, wherein the controller circuitry is configured in combination with the transceiver circuitry
- to transition from the inactive state into an idle state.

15. The communications device according to claim 14, wherein the controller circuitry is configured in combination with the transceiver circuitry
- to receive, whilst operating in the idle state, a paging message from a core network, CN, part of the wireless communications network, the paging message indicating that the communications device should transition from the idle state into a connected state with the wireless communications network, and
- to transition from the idle state into the connected state with the wireless communications network.

16. The communications device according to claim 15, wherein the controller circuitry is configured in combination with the transceiver circuitry
- to transmit, whilst operating in the connected state, the signals comprising uplink data to the wireless communications network.

17. A method of operating a communications device, the method comprising
- transmitting to the wireless communications network, whilst operating in an inactive state, one or more signals comprising uplink data using a first of a plurality of beams each for transmission in a different one of a plurality of spatial directions,
- detecting, whilst operating in the inactive state, that the first beam satisfies a beam failure condition a specified number of consecutive times, subsequently
- determining, whilst operating in the inactive state, that the first beam has failed,
- resetting, whilst operating in the inactive state, a timer each time a signal comprising uplink data is transmitted, the timer being configured to expire after a specified period of time, and
- detecting, whilst operating in the inactive state, that the beam failure condition is satisfied when the communications device determines that response has not been received from the wireless communications network for a transmitted signal comprising uplink data before the timer has expired.

18. A method of operating an infrastructure equipment forming part of a wireless communications network, the method comprising
- transmitting, to a communications device whilst the communications device is operating in an inactive state, one or more downlink signals using a first of a plurality of beams each for transmission in a different one of a plurality of spatial directions,
- detecting that, for a specified number of consecutive times, a response to one or more of the downlink signals has not been received from the communications device, subsequently
- determining that the first beam has failed, and
- resetting, whilst operating in the inactive state, a timer each time a signal comprising uplink data is transmitted, the timer being configured to expire after a specified period of time,
- detecting, whilst operating in the inactive state, that the beam failure condition is satisfied when the communications device determines that response has not been received from the wireless communications network for a transmitted signal comprising uplink data before the timer has expired.

* * * * *